INVENTOR.
GÜNTER FAUTH
HELMUT NUSSER

May 19, 1970 G. FAUTH ET AL 3,512,466
DOUBLE EXPOSURE PREVENTING MEANS FOR PHOTOGRAPHIC CAMERAS
Filed Aug. 24, 1967 3 Sheets-Sheet 2
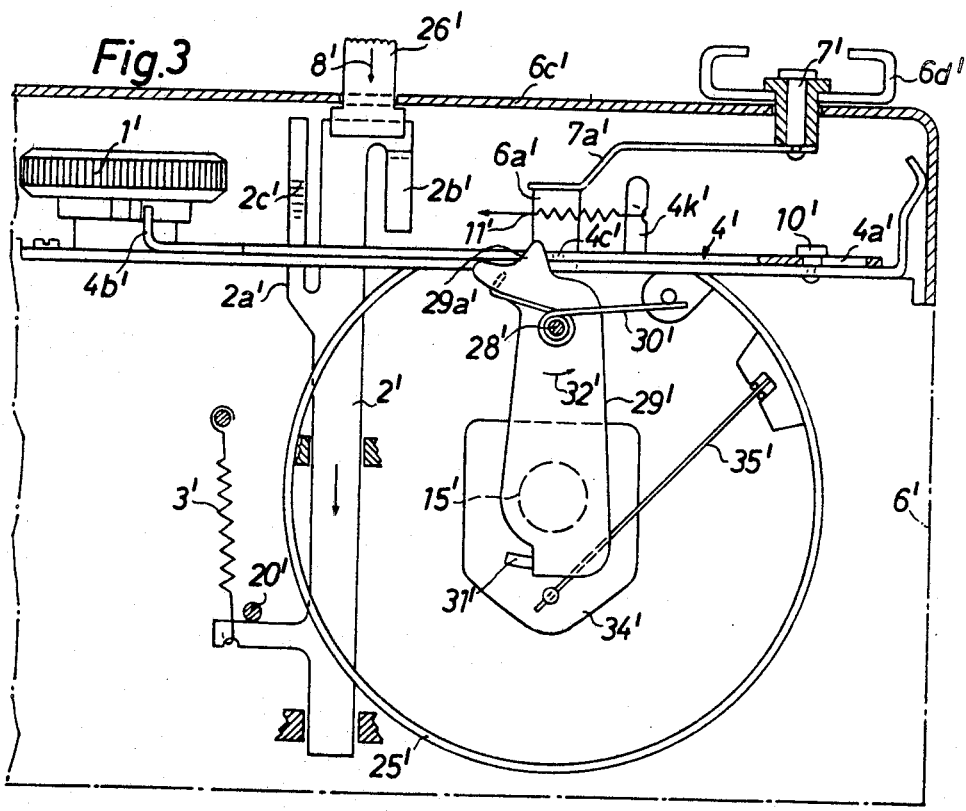
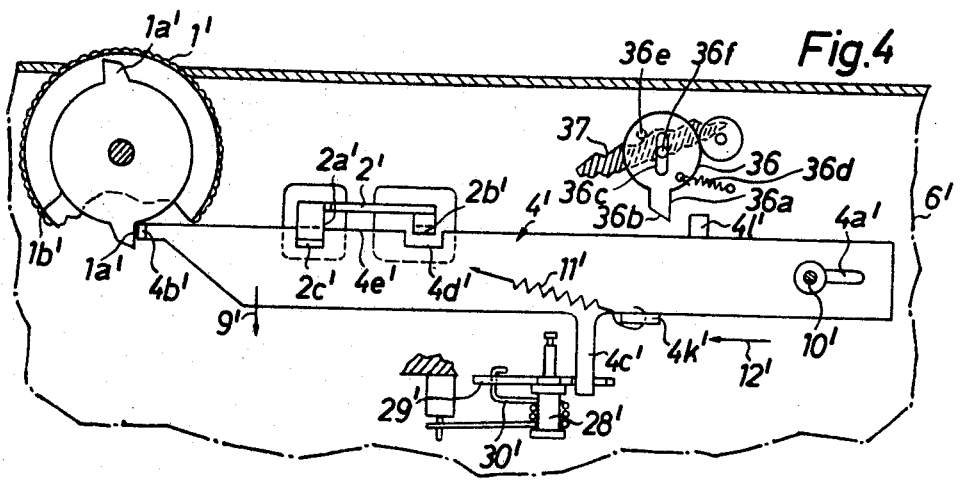
INVENTOR.
GÜNTER FAUTH
HELMUT NUSSER
BY

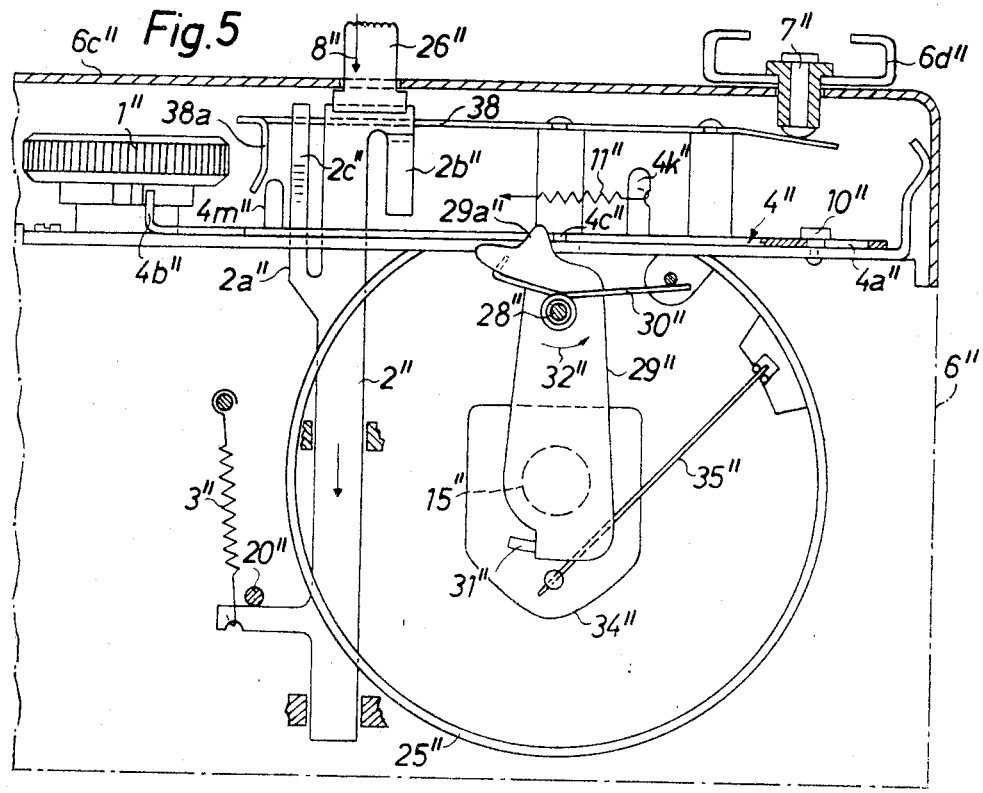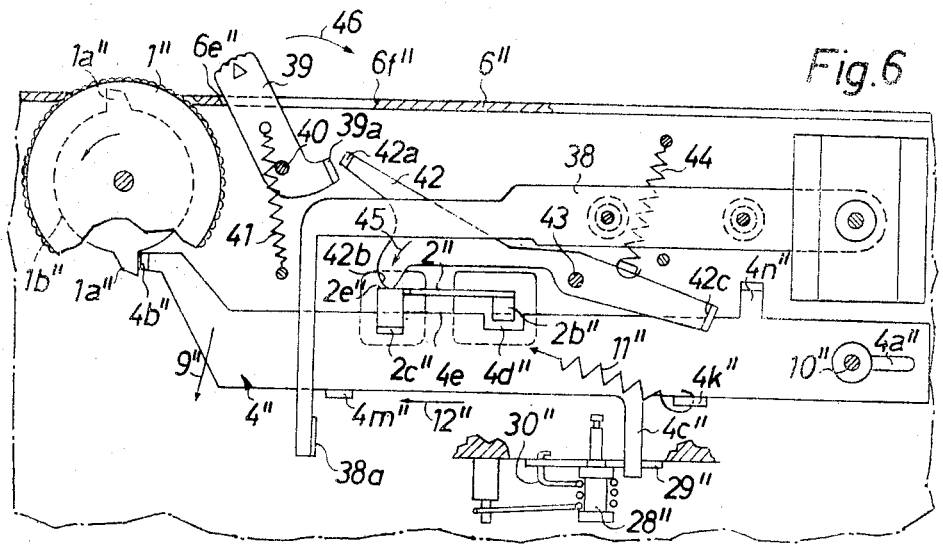

United States Patent Office 3,512,466
Patented May 19, 1970

3,512,466
DOUBLE EXPOSURE PREVENTING MEANS FOR PHOTOGRAPHIC CAMERAS
Günter Fauth, Unterhaching, and Helmut Nusser, Grafing-Stadt, Germany, assignors to Agfa-Gevaert Aktiengesellschaft, Leverkusen, Germany
Filed Aug. 24, 1967, Ser. No. 663,140
Claims priority, application Germany, Aug. 27, 1966,
A 53,359
Int. Cl. G03b *19/04*
U.S. Cl. 95—31    18 Claims

ABSTRACT OF THE DISCLOSURE

The blocking member of a still camera is movable by the film transporting mechanism from an uncocked position in which the blocking member prevents actuation of the shutter release to a cocked position in which the blocking member prevents further operation of the film transporting mechanism. The blocking member is biased to uncocked position and can move to such position in response to actuation of the shutter release. The normally closed shutter opens to admit scene light through the exposure aperture against an unexposed film frame in response to movement of the blocking member to uncocked position. The blocking member can also close the synchronizing switch of the flash circuit, either directly or through the intermediary of the shutter, and the blocking member can cooperate with a retard mechanism to automatically determine the exposure time, or with a manually operable device which is operated when the user wishes to select the exposure time by hand.

The shutter can comprise one, two or more blades and the blocking member can cooperate with the shutter directly or through the intermediary of one or more levers rings or other suitable motion transmitting devices.

BACKGROUND OF THE INVENTION

The present invention relates to cameras in general, and more particularly to improvements in double exposure preventing devices for photographic cameras. Still more particularly, the invention relates to improvements in cameras of the type wherein the double exposure preventing or blocking device serves to prevent actuation of the shutter release when the operator failed to place a fresh (unexposed) film frame into registry with the optical axis and wherein the blocking device also prevents transportation of film when an unexposed film frame is ready to be exposed to light coming from a viewed scene or subject.

In presently known cameras of the just outlined character, the shutter is often constructed in such a way that it is cocked by a trigger and is thereupon permitted to return to uncocked position and to expose a film frame in response to further depression of the trigger. It is also known to provide a still camera with a shutter which is cocked by the film transporting mechanism to make sure that the shutter can be released only when the exposure aperture is in registry with an unexposed film frame. A serious drawback of presently known cameras with double exposure preventing or blocking devices is that such blocking devices do not perform any addition function or functions and also that the blocking devices occupy too much room and contribute excessively to the initial cost and complicatedness of the camera.

SUMMARY OF THE INVENTION

It is an important object of our invention to provide a very simple, compact, rugged, reliable and highly versatile double exposure preventing or blocking device for photographic cameras.

Another object of the invention is to provide a camera wherein the blocking device performs certain important and advantageous functions in addition to blocking of the shutter release when the operator failed to actuate the film transporting mechanism and/or preventing the transport of film by more than the length of a frame.

A further obejct of the invention is to provide a double exposure preventing or blocking device which can be utilized as a means for operating the shutter.

An additional object of the invention is to provide a blocking device which can complete the flash circuit of a photographic camera at the exact moment when the exposure aperture is free to admit scene light to an unexposed film frame.

An ancillary object of the invention is to provide a blocking device which can operate different types of shutters.

A concomitant object of the invention is to provide a blocking device which can be used to provide a range of exposure times and which can also cooperate with manually operated means for maintaining the shutter in open position for as long as the operator desires.

Additional object of the invention is to provide a blocking device which is particularly suited for use in connection with so-called impeller type shutters wherein one or more shutter blades are propelled to open position against the action of one or more resilient elements.

In accordance with a feature of our invention, the camera comprises a housing providing an exposure aperture, film transporting means operative to place successive unexposed film frames into registry with the aperture, a shutter release movable between idle and releasing positions, a blocking device movable by the film transporting mechanism from an uncocked position in which it prevents movement of shutter release toward releasing position to a cocked position in which it prevents further transport of film, means for biasing the blocking device to uncocked position and operative in response to movement of shutter release to releasing position, and normally closed shutter means movable by the blocking means to an open position to admit scene light through the exposure aperture and against an unexposed film frame while the blocking device moves to uncocked position.

The blocking device may engage the shutter means directly or through the intermediary of one or more suitable motion transmitting portions of the shutter means. Furthermore, the blocking device may serve to close the synchronizing switch or switches, either directly, through the intermediary of the shutter means, or in another way, during movement from cocked to uncocked position. Also, the blocking device may be combined or may cooperate with a retard mechanism which can be set to furnish an exposure time of desired duration, and the blocking device can also cooperate with a system of levers or the like to maintain the shutter means in open position for as long as the operator desires.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary schematic front elevational view of a second camera with a modified blocking device;

FIG. 4 is a horizontal section through the camera of FIG. 3;

FIG. 5 is a fragmentary schematic front elevational view of a third camera having a different blocking device; and FIG. 6 is a horizontal section through the camera of FIG. 5.

DESCRIPTION OF THE PREFERRED EMBODIMENTS

Figure 1:
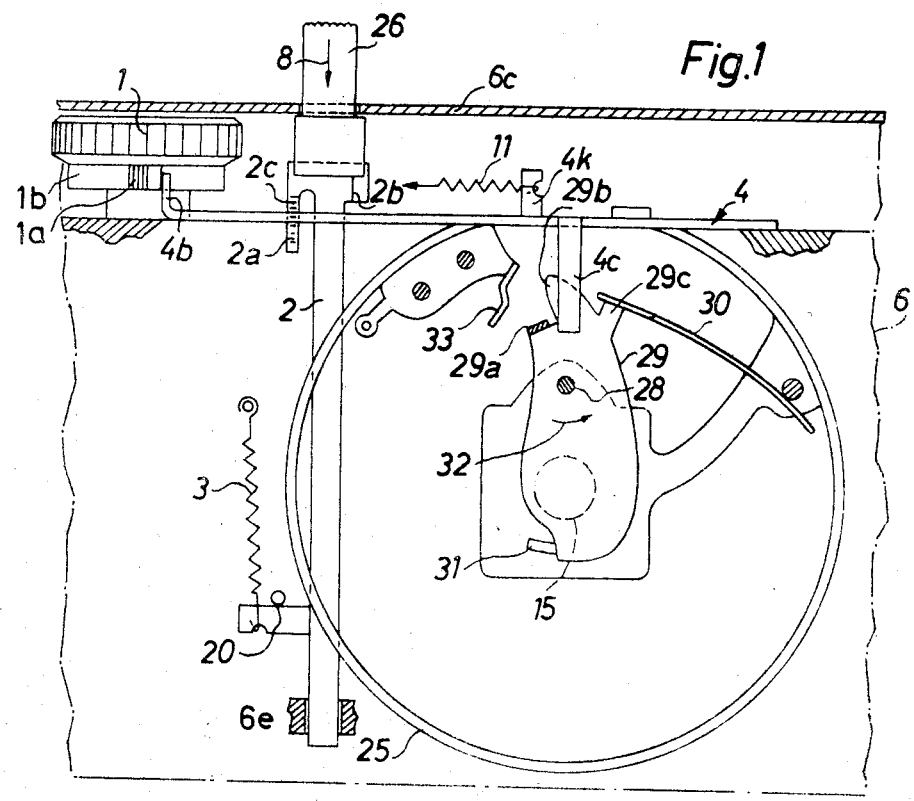
FIG. 1 is a fragmentary schematic front elevational view of a photographic camera embodying a blocking device which is constructed in accordance with a first embodiment of our invention, a portion of the camera housing being shown in vertical section.
Figure 2:
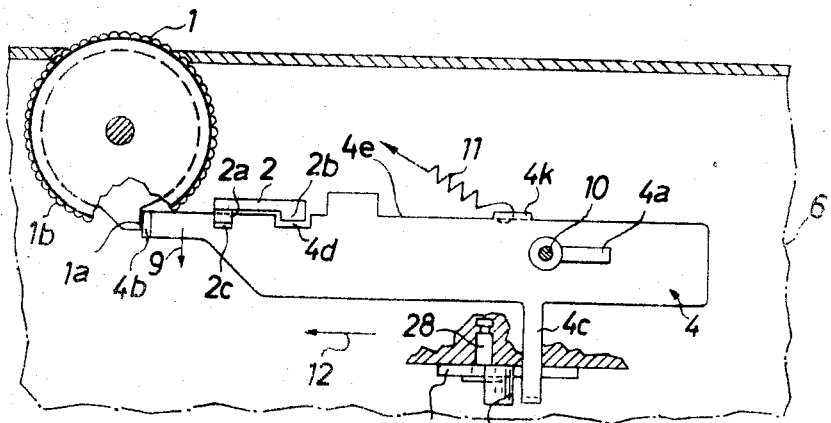
FIG. 2 is a horizontal sectional view of the structure shown in FIG. 1.

The camera of FIGS. 1 and 2 comprises a housing 6 having a top portion or cover 6c which preferably carries an accessory shoe (see FIG. 3). The front wall of the housing 6 supports an objective mount 25 and this housing is provided with an exposure aperture 15 which can admit light along the optical axis and against an unexposed film frame (not shown). The shutter release comprises a vertically reciprocable pushbutton or knob 26 and a slide or carriage 2 which is rigid with the knob 26 and is guided in bearings 6e of the housing 6. A return spring 3 biases the shutter release to the idle position of FIG. 1 in which an arm of the carriage 2 bears against a fixed stop post 20. The carriage 2 is further provided with two projections 2a, 2b the former of which has an inclined cam surface 2c.

The film transporting mechanism comprises a wheel 1 whose peripheral surface is knurled and a portion of which extends through a slot in the rear wall of the top portion 6c to be engageable by a finger of the operator. The wheel 1 can transport the film in a manner which does not form part of the present invention and carries a motion transmitting cam 1b having at least one projection or tooth 1a. The wheel 1 can be replaced by a lever or by any other suitable manually operable actuating means.

A blocking device or member 4 which serves as a means for preventing double exposure is installed in the space below the top portion 6c and one of its ends is shaped as a follower 4b which normally bears against the tooth 1a to prevent rotation of the wheel 1 in a sense to transport the film, excepting at a time when the operator has completed an exposure in response to depression of the knob 26 (arrow 8) to move the carriage 2 downwardly to a releasing position. The blocking member 4 is permanently biased to uncocked position by a helical spring 11 which operates between the housing 6 or its top portion 6c and a spring retainer 4k on the median portion of the blocking member 4. The latter has an elongated slot 4a which receives the stem of a pivot pin 10 fixed to a horizontal partition of the housing 6 below the top portion 6c. The blocking member 4 is movable lengthwise from a cocked position (shown in FIGS. 1 and 2) to the aforementioned uncocked position (under the bias of the spring 11). Furthermore, the blocking member 4 can also turn about the axis of the pivot pin 10. The distance covered by the blocking member 4 during movement from cocked to uncocked position or vice versa is determined by the length of the slot 4a. The rear edge 4e of the blocking member 4 has a notch or recess 4d which accommodates the projection 2b when the carriage 2 is in the idle position of FIGS. 1 and 2 and when the blocking member is cocked. The projection 2b then prevents the blocking member 4 from moving to uncocked position under the bias of the spring 11. Such movement of the blocking member is further prevented by the tooth 1a of the motion transmitting cam 1b on the film transporting wheel 1. Of course, and since the projection 2b extends into the notch 4d, and since the follower 4b of the blocking member bears against the tooth 1a, the wheel 1 cannot be turned in a counterclockwise direction, namely, in a direction to advance the film by the length of a frame. It is assumed in FIG. 1 or 2 that the wheel 1 has already placed an unexposed film frame into registry with the exposure aperture 15 so that the camera is ready to make an exposure in response to movement of the knobs 26 and carriage 2 to releasing position.

If the user decides to make an exposure, he simply depresses the knob 26 in the direction indicated by arrow 8 whereby the cam surface 2c of the projection 2a bears against the rear edge 4e of the blocking member 4 and causes the latter to turn on the pivot pin 10 in the direction indicated by arrow 9. The blocking member 4 cannot interfere wtih movement of the shutter release to releasing position because its notch 4d registers with the projection 2b of the carriage 2. As the blocking member 4 turns in the direction indicated by arrow 9, the follower 4b moves away from the tooth 1a (i.e., radially of and away from the motion transmitting cam 1b) so that the spring 11 is free to contract and to propel the blocking member 4 to uncocked position. Of course, the cam surface 2c also causes the notch 4d to move away from the projection 2b so that the latter cannot interfere with contraction of the spring 11 and resulting propulsion of the blocking member to uncocked position. Such movement of the blocking member 4 is indicated by the arrow 12, and the movement is terminated when the surface bounding the righthand end of the slot 4a reaches the stem of the pivot pin 10. If desired, the length of the slot 4a can be related to the position of the notch 4d in the rear edge 4e of the blocking member 4 in such a way that the projection 2a of the carriage 2 enters the notch 4d when the blocking member assumes the uncocked position at which time the spring 11 causes the blocking member to turn in a clockwise direction, i.e., counter to that indicated by the arrow 12. At the same time, a projection or portion 4c of the blocking member 4 moves laterally and away from registry with a projecting portion or extension 29a of a shutter blade 29.

If the knob 26 is thereupon released so that the spring 3 can contract in order to return the carriage 2 into abutment with the stop post 20 (idle position of the shutter release), the cam surface 2c moves upwardly with the projection 2a and allows the spring 11 to turn the blocking member 4 in a counterclockwise direction (counter to that indicated by arrow 9) until the rear edge 4e strikes against the top land of the tooth 1a on the motion transmitting cam 1b. Thus, the wheel 1 is then free to rotate in a counterclockwise direction, as viewed in FIG. 2, and to place an unexposed film frame into registry with the exposure aperture 15. Rotation of the wheel 1 is not terminated when the radial flank of the tooth 1a strikes against the follower 4b but only after the 4 by moving it in a direction to the right and against the opposition of the spring 11 until the surface bounding the left-hand end of the slot 4a reaches the stem of the pivot pin 10. At such time, the spring 11 pivots the blocking member 4 in a clockwise direction because the notch 4d is in registry with the projection 2b whereby the latter locks and maintains the blocking member 4 in cocked position until and unless the operator decides to depress the knob 26 of the shutter release.

It will be noted that, when in uncocked position, the blocking member 4 prevents depression of the knob 26 because the projection 2b does not register with the notch 4d. Thus, when in uncocked position, the blocking member 4 prevents operation of the shutter release and when in cocked position, the blocking member prevents transportation of the film. The blocking member 4 cannot leave the cocked position unless the shutter release is caused to move from idle to releasing position, and the film transporting mechanism (wheel 1) serves as a means for cocking the blocking member 4 through the intermediary of the motion transmitting cam 1b.

A suitable one-way clutch (not shown and including, for example, a ratchet and pawl mechanism) is combined with the cam 1b to prevent rotation of the wheel 1 in a clockwise direction, as viewed in FIG. 2.

The housing 6 accommodates the aforementioned shutter blade 29 which forms part of a normally closed simple shutter and is turnable on a pivot pin 28 and carries the forwardly bent projecting portion or extension 29a which can cooperate with the projection or portion 4c of the blocking member 4. The shutter further comprises resilient means in the form of a leaf spring 30 which biases the shutter blade 29 against a fixed stop 31 of the housing 6 whereby the blade assumes a closed or light-obstructing position in which it overlies the exposure aperture 15. When the blocking member 4 moves from cocked to uncocked position, its portion 4c strikes against the projection 29a of the shutter blade 29 and turns the blade on the pivot pin 28 in a counterclockwise direction (arrow 32). The lower half of the blade 29 (which latter resembles a two-armed lever) moves away from the stop 31 and permits light coming from a viewed scene or subject to pass through the aperture 15 and to impinge upon the light-sensitive surface of the unexposed film frame. During such rotation, a lug 29c of the shutter blade 29 deforms the spring 30 so that the latter stores energy and propels the blade back into abutment with the stop 31 as soon as the lower end of the projection 4c moves beyond the projection 29a. Thus, the positioning of the projections 4c, 29a, the length of the projection 4c, the position of the stop 31 and the bias of the spring 30 will determine the exposure time, namely, the length of that interval during which the blade 29 is held in open or light-admitting position out of full overlap with the exposure aperture 15.

It will be seen that, in the embodiment of FIGS. 1 and 2, the blocking member 4 performs a series of important functions including those which were mentioned hereinabove in connection with the description of FIGS. 1 and 2 and the further function of operating the shutter to determine the exposure time. The shutter of the camera shown in FIGS. 1 and 2 operates on the impeller principle because the blade 29 is propelled from closed position by the projection 4c and is permanently biased to such closed position by the leaf spring 30.

Furthermore, the blocking member 4 can effect completion of the flash circuit by causing a current-conducting switch contact 29b of the blade 29 to engage with a yieldable contact 33 on the camera housing when the blade uncovers the aperture 15. The synchronizing switch including the contacts 29b, 33 forms part of the flash circuit and causes the flash unit to furnish artificial light. The flash unit can be built into the camera or has a foot detachably inserted into the aforementioned accessory shoe on the top portion 6c of the housing 6.

The projection 29a has an inclined cam surface or ramp over which the projection 4c slides when the cam 1b causes the blocking member 4 to return to cocked position. The shutter blade 29 then remains in abutment with the stop 31 and the aperture 15 remains sealed from incoming light. It is clear that the ramp can be provided on the projection 4c instead of on the projection 29a or that each of these projections may include a suitably inclined ramp.

FIGS. 3 and 4 illustrate a second camera which comprises a slightly modified shutter release including a pushbutton or knob 26' and a carriage, a modified blocking member 4', and a modified shutter blade 29'. The housing 6' of the camera comprises a portion or support 34 which defines an exposure aperture 15' and consists of synthetic plastic material. The support 34 carries an elongated piece of metallic wire 35. When the blade 29' turns on the pivot pin 28', its lower part slides along the wire 35, i.e., it is held out of direct contact with the support 34 to reduce friction and to prevent charging of plastic parts. The blade 29' is preferably made of metal and, if it were permitted to slide along the plastic support 34, the latter could be electrically charged, especially when the blade would travel at a high speed. The wire 35 prevents direct frictional engagement between the parts 29' and 34.

Another difference between the cameras of FIGS. 1–2 and 3–4 is that the synchronizing switch of the flash circuit is actuated directly by the blocking member 4'. The accessory shoe 6d' on the top portion 6c' of the housing 6' is provided with a central contact 7' which carries an elastic contact blade 7a' normally resting on an insulating post 6a' of the housing 6'. When the blocking member 4' moves from cocked position, its spring retainer 4k' engages the contact blade 7a' to complete the flash circuit. The engagement between the contact blade 7a' and the spring retainer 4k' takes place at a time when the shutter blade 29' permits light to enter the exposure aperture 15' in the plastic support 34.

The blocking member 4' further carries a projection 41' which can actuate a delay or retard mechanism having a projection 36a extending into the path of movement of the projection 41'. The projection 36a is provided on a disk 36 having a follower pin 36e cooperating with a timer cam 37. A spring 36d biases the disk 36 in a counterclockwise direction, as viewed in FIG. 4, and against the timer cam 37. The latter is adjustable to determine the initial angular position of the projection 36a and the time required by the disk 36 to yield to the bias of the spring 11 in order to permit further movement of blocking member 4' from an intermediate position in which the blade 29' is open to uncocked position. When the blocking member 4' returns to cocked position (under the action of the motion transmitting cam 1b' on the film transporting wheel 1'), the projection 41' engages an inclined surface 36b of the projection 36a and shifts the disk 36 with reference to a shaft 36f which extends into a diametral slot 36c of the disk.

It is clear that the retard mechanisms of FIG. 4 could be replaced by a different retard mechanism, for example, by one connected to and serving to adjust the position of the stop 31' for the shutter blade 29' and to thereby control the extent to which the blade can pivot in response to engagement of its projection 29a' with the projection 4c' of the blocking member 4'. Otherwise stated, by changing the position of the stop 31', the operator of the camera can select the initial position of the projection 29a' and thus the exact moment when the projection 29a' is engaged by the projection 4c' while the blocking member 4' moves to uncocked position under the bias of the spring 11'.

The remaining parts of the camera shown in FIGS. 3 and 4 are analogous to those described in connection with FIGS. 1–2 and are denoted by similar reference numerals, each followed by a prime.

The camera of FIGS. 5 and 6 is provided with a modified synchronizing switch and further comprises manually operated means for admitting light to the exposure aperture 15" for as long as the operator desires. The blocking member 4" has two additional projections 4n" and 4m" the latter of which forms one contact of a synchronizing switch in the flash circuit. The central contact 7" of the accessory shoe 6d" on the top portion 6c" of the housing 6" bears against one end of a contact blade 38 mounted on insulating supports in the housing 6". A manually operated lever 39 has a first portion or arm extending through a slot in the rear wall of the housing 6" and a second portion or arm 39a. The lever 39 is mounted on a pivot pin 40 and serves to select the exposure time at the will of the operator. The contact blade 38 has a terminal or contact 38a which can be engaged by the projection or contact 4m" of the blocking member 4" to complete the flash circuit. Thus, the contacts 38a, 4m" constitute a synchronizing switch for the flash circuit, and this switch is closed when the blocking member 4" travels from cocked toward uncocked position under the action of the spring 11″ (arrow 12″). When the carriage 2″ of the shutter release travels back toward its idle position under the action of the spring 3‴, the spring 11″ causes the blocking member 4″ to turn on the pivot pin 10″ in a clockwise direction (counter to that indicated by the arrow 9″) until its follower 4b″ reaches the peripheral surface of the cam 1b″. This moves the contact 4m″ away from the contact 38a so that the synchronizing switch is open both in cocked and uncocked positions of the blocking member 4″.

The lever 39 is biased by a spring 41 which tends to maintain its first portion or arm in abutment with a shoulder 6e″ of the housing 6″. The arm 39a of the lever 39 then allows a second lever 42 to assume the angular position shown in FIG. 6 in which the right-hand portion or arm 42c of the lever 42 is held out of the path of the projection 4n″ by a helical spring 44. The lever 42 is pivotable on a pin 43 and its left-hand portion or arm 42a extends into the path of movement of the arm 39a on the lever 39. The lever 42 also has a third portion or arm 42b which cooperates with the rear face 2e″ of the carriage 2″. When the shutter release is moved to releasing position in response to depression of the knob 26″, the rear face 2e″ of the carriage 2″ moves beyond the arm 42b of the lever 42 but the spring 44 cannot contract because the arm 42a strikes against the arm 39a of the lever 39 (when the latter is held in the position shown in FIG. 6). Therefore, the projection 4n″ of the blocking member 4″ is free to bypass the arm 42c and to cause the shutter blade 29″ to furnish an automatically determined exposure time.

If the operator wishes to select a longer exposure time, the first arm of the lever 39 is moved into abutment with the shoulder 6f″ of the housing 6″ (arrow 46) whereby the arm 39a moves away from the path of movement of the arm 42a. When the knob 26″ is depressed and the rear face 2e″ of the carriage 2″ moves downwardly and beyond the arm 42b, spring 44 turns the lever 42 in the direction indicated by arrow 45 and the lever 42 ultimately engages a stop 45a whereby the arm 42c extends into the path of the projection 4n″ and holds the blocking member 4″ in an intermediate position in which the blade 29″ exposes the aperture 15″ to incident light. The shutter remains open until the operator returns the lever 39 into abutment with the shoulder 6e″ in order to permit movement of the blocking member 4″ to uncocked position (arrow 12″). This moves the projection 4c″ beyond the projection 29a″ so that the spring 30″ can return the blade 29″ to closed position.

Certain other numerals employed in FIGS. 5 and 6 denote parts which are identical or analogous to the parts mentioned in connection with FIGS. 1 to 4, but each such numeral is followed by two primes.

The camera of our invention is susceptible of many additional modifications. For example, the blocking member could be arranged to operate a modified shutter with two or more blades. If the shutter comprises two blades, the blocking member can be arranged to cooperate with a lever or a like portion provided on one of the blades and serving to open the shutter during movement of the blocking member to uncocked position. If the shutter comprises a large number of blades which are mounted on one or more shutter portions in the form of rings, at least one of the rings can cooperate with the blocking member to open the shutter while the blocking member travels from cocked to uncocked position. The lever of a two-blade shutter or the ring or rings of a multiple-blade shutter are biased by one or more return springs to close the shutter as soon as the blocking member covers a predetermined distance during movement from cocked position. In such cameras, the shutter preferably comprises an auxiliary blade which covers the exposure aperture while the blocking member moves back to cocked position. An auxiliary shutter in the form of a blade provided on the shutter release and serving to cover the aperture during movement of blocking member to cocked position is disclosed in the copending application Ser. No. 663,146 filed Aug. 24, 1967 by Gunter Fauth which is assigned to the same assignee. It is equally possible to provide an auxiliary shutter blade which is operated by the blocking member and has an opening or cutout which registers with the aperture 15, 15′ or 15″ when the blocking member moves toward uncocked position and the shutter should admit light to an unexposed film frame. Such auxiliary blade can be permanently connected with the blocking member to cover the exposure aperture during movement of the blocking member from uncocked and back to cocked position.

Furthermore, the camera of FIGS. 1–2 and/or FIGS. 5–6 can also be provided with a retard mechanism to allow for automatic determination of different exposure times. For example, the manually operated lever 39 of FIGS. 5–6 could be employed to actuate a retard mechanism in addition to its primary function of enabling the operator to select the exposure time at his or her will.

It is equally possible to modify the structure which opens and completes the flash circuit. For example, the blocking member 4, 4′ or 4″ could be provided with two trips, one of which would close and the other of which would open the synchronizing switch during movement toward uncocked position. It is further possible to provide the flash circuit with two series-connected switches at least one of which is open in each end position of the blocking member and both of which close when the blocking member causes the shutter to admit light to the exposure aperture.

Since the blocking member can be constructed in the form of a flat elongated bar which occupies little room and can be manufactured at minimal cost, its use in a still camera brings about considerable savings in space, material and labor. Furthermore, and due to its elongated shape, the blocking member can be provided with a large number of projections, notches, slots, teeth and the like so that it can perform several important functions in its end positions as well as during travel between such end positions.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera, a combination comprising a housing providing an exposure aperture; film transporting means operative to place unexposed film frames seriatim into registry with said aperture; a shutter having at least one blade movable from a normal closed position to an open position to admit scene light to said aperture; release means operative to move from an idle position to a releasing position; a blocking means movable from a cocked position to an uncocked position to thereby move said blade to open position by direct engagement of said blade and to simultaneously prevent operation of one of said aforesaid means; and motion-transmitting means between said release means and said blocking means for causing movement of said blocking means from a cocked to an uncocked position in response to movement of said release means from said idle to said releasing position.

2. A combination as defined in claim 1, further comprising means for biasing said blocking means to uncocked position, said blocking means being movable by said film transporting means from said uncocked position in which it blocks movement of said release means to releasing position to said cocked position in which it prevents operation of said film transporting means, said biasing means being operative in response to movement of said release means to releasing position.

3. A combination as defined in claim 2, wherein said film transporting means comprises motion transmitting means for moving said blocking means to cocked position in response to placing of an unexposed film frame into registry with said aperture.

4. A combination as defined in claim 2, wherein said shutter further comprises resilient means for biasing said blade to closed position and said blocking means comprises a portion arranged to propel the blade to open position against the opposition of said resilient means in response to movement from cocked position.

5. A combination as defined in claim 2, wherein said shutter further comprises resilient means for biasing said blade to closed position and a portion extending into the path of movement of said blocking means to uncocked position to propel said blade to open position against the action of said resilient means.

6. A combination as defined in claim 2, further comprising retard means cooperating with said blocking means for delaying the movement of said blade to closed position to provide a desired exposure time.

7. A combination as defined in claim 6, wherein said retard means comprises means for maintaining the blocking means in an intermediate position corresponding to open position of said blade.

8. A combination as defined in claim 2, further comprising a flash circuit having normally open switch means arranged to close in response to movement of said blocking means to uncocked position at a time when said blade assumes said open position.

9. A combination as defined in claim 8, wherein said switch means comprises a first contact carried by said housing and a second contact normally spaced from said first contact, said blocking means having means for moving said second contact against said first contact in response to movement from cocked position.

10. A combination as defined in claim 8, wherein said blocking means, is arranged to effect opening of said switch means in said uncocked position thereof.

11. A combination as defined in claim 8, wherein said switch means comprises a first contact on said housing and a second contact on said blade, said second contact engaging said first contact in the open position of said blade.

12. A combination as defined in claim 2, further comprising manually operated means for determining the period during which said blade dwells in open position, said manually operated means comprising a portion movable into the path of movement of said blocking device to uncocked position.

13. A combination as defined in claim 12, wherein said manually operated means comprises a pair of levers one of which is turnable by hand between first and second positions and the other of which is biased against said release means in the idle position of the latter, said portion being constituted by one arm of said other lever and extending into the path of movement of said blocking means in the second position of said one lever, the latter having an arm which prevents movement of said portion into the path of said blocking lever in the first position of said one lever.

14. A combination as defined in claim 1, wherein said blocking means comprises an elongated substantially flat body of metallic material.

15. A combination as defined in claim 1, wherein said housing defines a pivot axis for said blocking means, said means turning about said axis in response to movement of said release means to releasing position.

16. A combination as defined in claim 1, wherein said film transporting means comprises a rotary cam and wherein said blocking means comprises follower means receiving motion from said cam to move the blocking means to cocked position in response to rotation of said cam.

17. A combination as defined in claim 1, wherein said release means is reciprocable between said idle and releasing positions and wherein said blocking means is reciprocable between said cocked and uncocked position.

18. A combination as defined in claim 1, wherein said housing comprises a support for said shutter, said support consisting of plastic material and said blade consisting of metallic material and further comprising means for preventing direct frictional engagement between said support and said blade.

References Cited

UNITED STATES PATENTS

| | | | |
|---|---|---|---|
| 1,084,137 | 1/1914 | Dolby | 95—61 |
| 1,917,330 | 7/1933 | Riddell | 95—61 |
| 2,722,872 | 11/1955 | Schrader | 95—31 |
| 2,940,374 | 6/1960 | Fuerst | 95—60 |
| 3,232,196 | 2/1966 | Sapp, et al. | 95—31 |
| 3,353,467 | 11/1967 | Ernisse et al. | 95—11.5 |

NORTON ANSHER, Primary Examiner

D. S. STALLARD, Assistant Examiner